(12) United States Patent
Meggiolan

(10) Patent No.: US 7,749,119 B2
(45) Date of Patent: Jul. 6, 2010

(54) DEVICE AND METHOD FOR INSERTING AN ARTICULATION PIN FOR A CHAIN PARTICULARLY FOR BICYCLES

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 20 days.

(21) Appl. No.: 10/165,147

(22) Filed: Jun. 7, 2002

(65) Prior Publication Data

US 2003/0022747 A1  Jan. 30, 2003

(30) Foreign Application Priority Data

Jun. 12, 2001  (IT) .............................. TO01A0561

(51) Int. Cl.
*F16G 13/06* (2006.01)
*F16B 9/00* (2006.01)
*B62M 9/00* (2006.01)
*B21L 9/06* (2006.01)

(52) U.S. Cl. .................. 474/230; 474/231; 474/227; 474/228; 59/8

(58) Field of Classification Search ......... 474/230–231, 474/227–229, 234, 223, 213, 218, 219, 222; 411/43, 34, 70.69, 35, 2, 39, 424; 29/257, 29/283, 509, 523, 524.1; 59/7, 11, 35.1, 59/8–9, 84
See application file for complete search history.

(56) References Cited

U.S. PATENT DOCUMENTS

| 3,276,308 | A | * | 10/1966 | Bergere ........................ 411/43 |
| 3,802,184 | A | * | 4/1974 | Brown et al. ...................... 59/7 |
| 3,937,123 | A | * | 2/1976 | Matuschek et al. ............ 411/43 |
| 4,050,139 | A | * | 9/1977 | Okamuro ....................... 29/283 |
| 4,165,660 | A | * | 8/1979 | Behrens ......................... 81/55 |
| 4,494,495 | A |   | 1/1985 | Ogino |
| 4,494,945 | A | * | 1/1985 | Ogino ......................... 474/231 |
| 4,702,655 | A | * | 10/1987 | Kendall ........................ 411/34 |
| 4,844,673 | A | * | 7/1989 | Kendall ........................ 411/34 |
| 5,092,118 | A |   | 3/1992 | VanDeMark |
| 6,110,064 | A |   | 8/2000 | Guichard |
| 6,490,853 | B1 | * | 12/2002 | Winklhofer et al. .............. 59/7 |

FOREIGN PATENT DOCUMENTS

| EP | 0381152 | 1/1990 |
| EP | 0381152 | 8/1990 |

(Continued)

OTHER PUBLICATIONS

Notification of Pre-Trial Reexamination, JP 2002-171619, Dated Sep. 30, 2008.

*Primary Examiner*—Marcus Charles
(74) *Attorney, Agent, or Firm*—Volpe and Koenig, P.C.

(57) ABSTRACT

A device for inserting an articulation pin (28) to pivotally connect the outer plates (12) and the inner plates (14) of a chain, particularly a bicycle chain. The device comprises an articulation pin (28) and a guide element (30) which is to be separated from the pin (28) after the insertion of the pin (28) within aligned holes (16, 18) of the plates (12, 14). The pin (28) is provided at one end thereof with a snap engaging portion (38) shaped so as to expand the holes (16) of the outer plates (12) in a radial direction during the insertion of the pin.

13 Claims, 4 Drawing Sheets

FOREIGN PATENT DOCUMENTS

| | | | |
|---|---|---|---|
| GB | 143638 | | 5/1920 |
| GB | 267692 | | 3/1927 |
| GB | 1261282 A | * | 1/1972 |
| JP | JUM6337809 | | 3/1988 |
| JP | JUM6337810 | | 3/1988 |
| JP | JUM2101151 | | 8/1990 |
| JP | JUM5134952 | | 8/1992 |
| JP | 08-52608 A | * | 2/1996 |
| JP | 9150325 | | 10/1997 |
| JP | 11-51124 A | * | 2/1999 |
| JP | 2000-320620 A | * | 11/2000 |

* cited by examiner

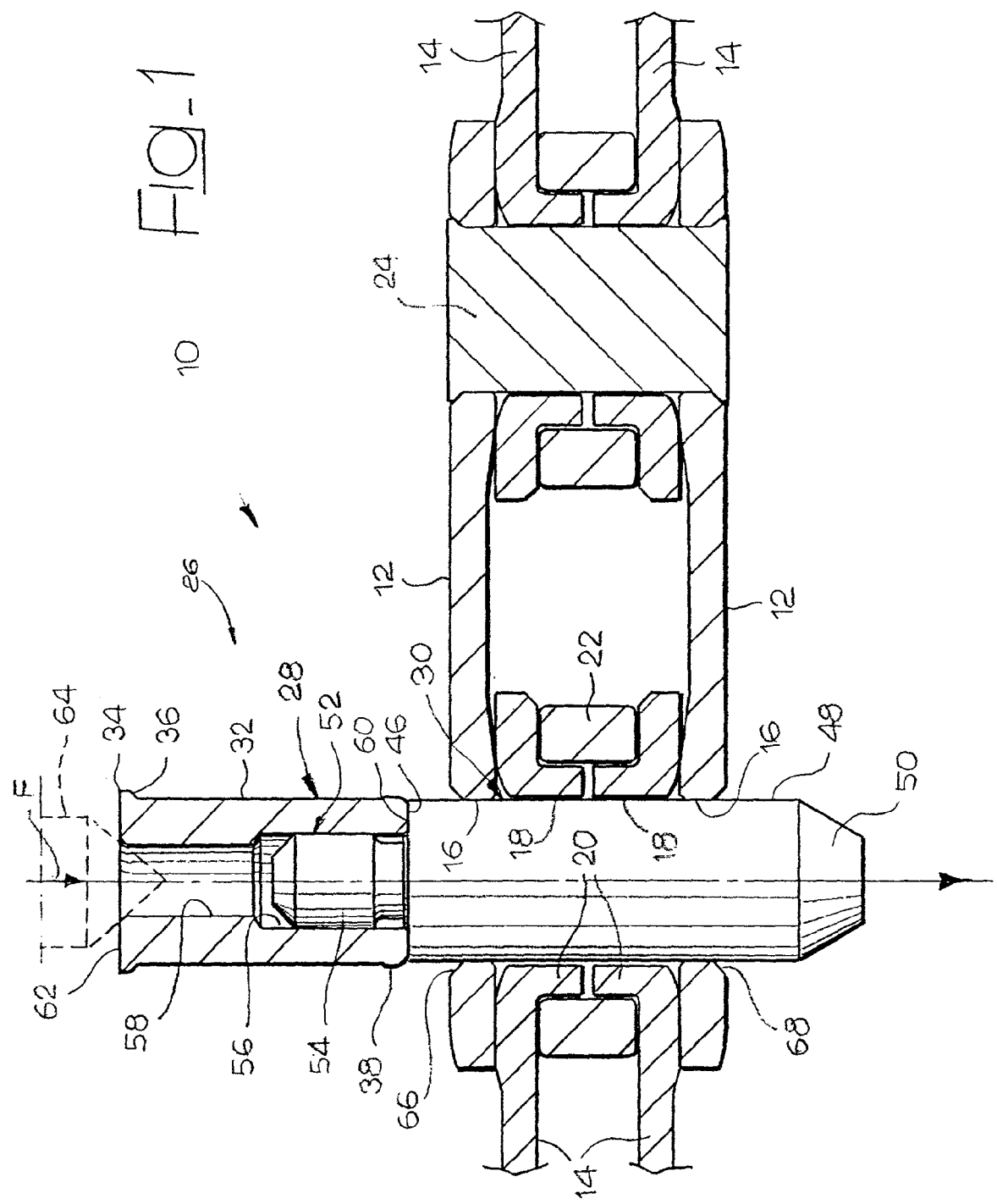

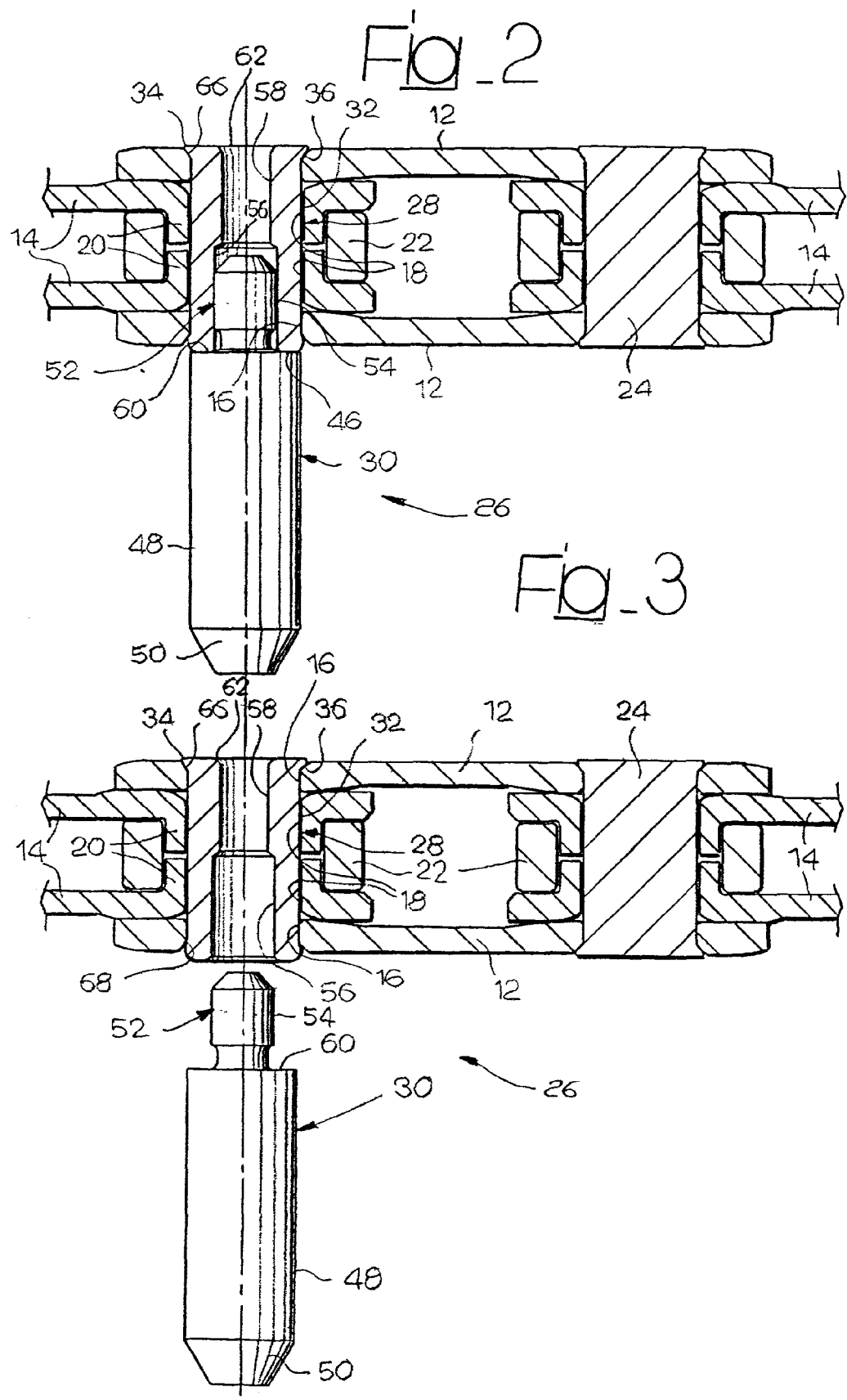

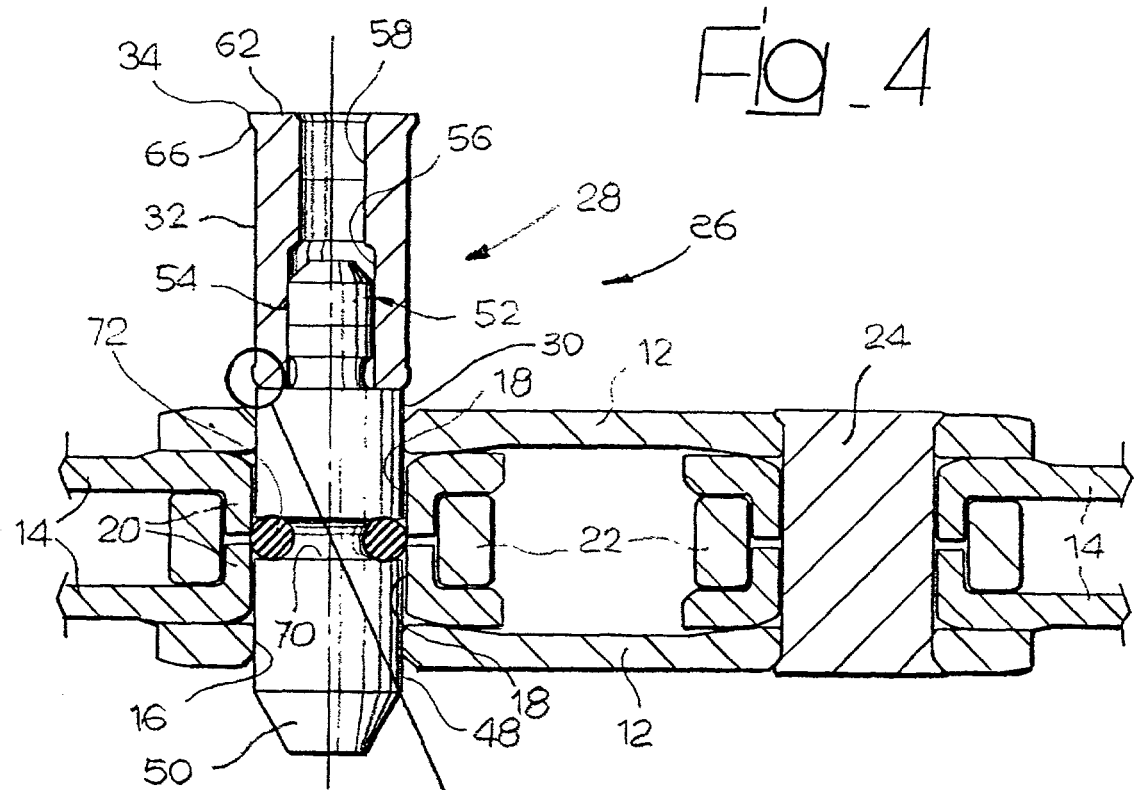
Fig_4
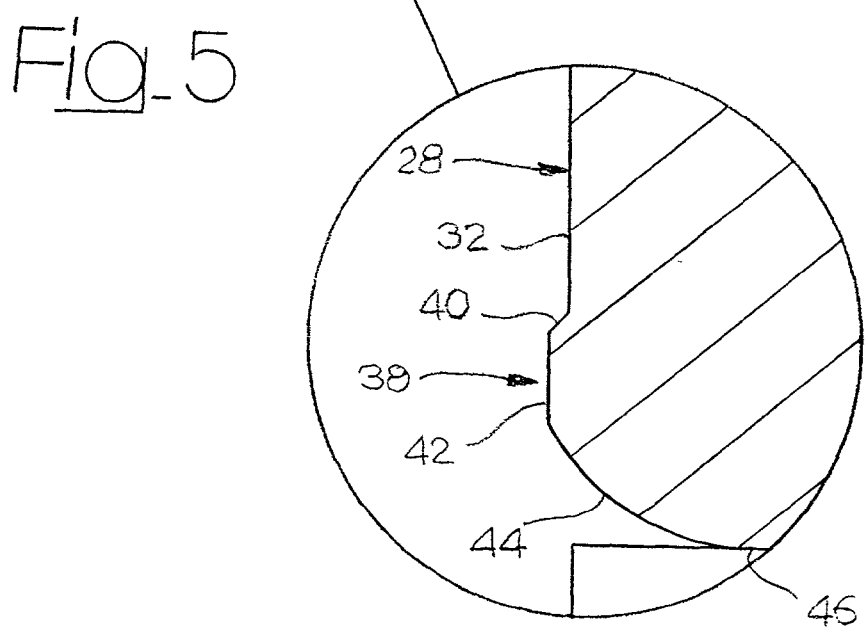
Fig_5

DEVICE AND METHOD FOR INSERTING AN ARTICULATION PIN FOR A CHAIN PARTICULARLY FOR BICYCLES

BACKGROUND

The current invention has been developed particularly to solve the problem of closing a chain loop, i.e. mutually connecting the two ends of a chain after that the chain has been arranged around the chain rings and the sprocket assembly of a bicycle. In particular, the present invention has the object of solving the problem due to the damage of the pin during insertion thereof within the aligned holes of the inner and outer plates of a chain.

U.S. Pat. No. 4,494,945 describes an articulation pin for a chain, having a guide portion connected to a pin body by means of a narrow section. The insertion of the pin body within the aligned holes of the inner and outer plates of the chain is carried out by applying a drawing force to the guide element by tightening a nut which engages a threaded portion of the guide element. The guide element is separated from the pin body by breaking the narrow connecting section at the end of the inserting operation of the pin body.

SUMMARY

The present invention relates to a device and a method for inserting an articulation pin for interconnecting a pair of inner plates and a pair of outer plates of a chain, particularly a bicycle chain. The object of the present invention is to provide a device and a method for inserting an articulation pin which reduces the risk of damage to the pin and which is simpler to be used.

BRIEF DESCRIPTION OF THE DRAWING(S)

The present invention will be now described in detail with reference to the annexed drawings, given purely by way of non limiting example, in which:

FIG. 1 is an axial cross-section showing the insertion step of an articulation pin according to the invention, FIGS. 2 and 3 show two further steps of the insertion operation of the pin of FIG. 1, FIG. 4 shows a variant of the pin of FIG. 1, and FIG. 5 shows an enlarged detail of the circled portion of FIG. 4.

DETAILED DESCRIPTION OF THE PREFERRED EMBODIMENT(S)

Figure 6:
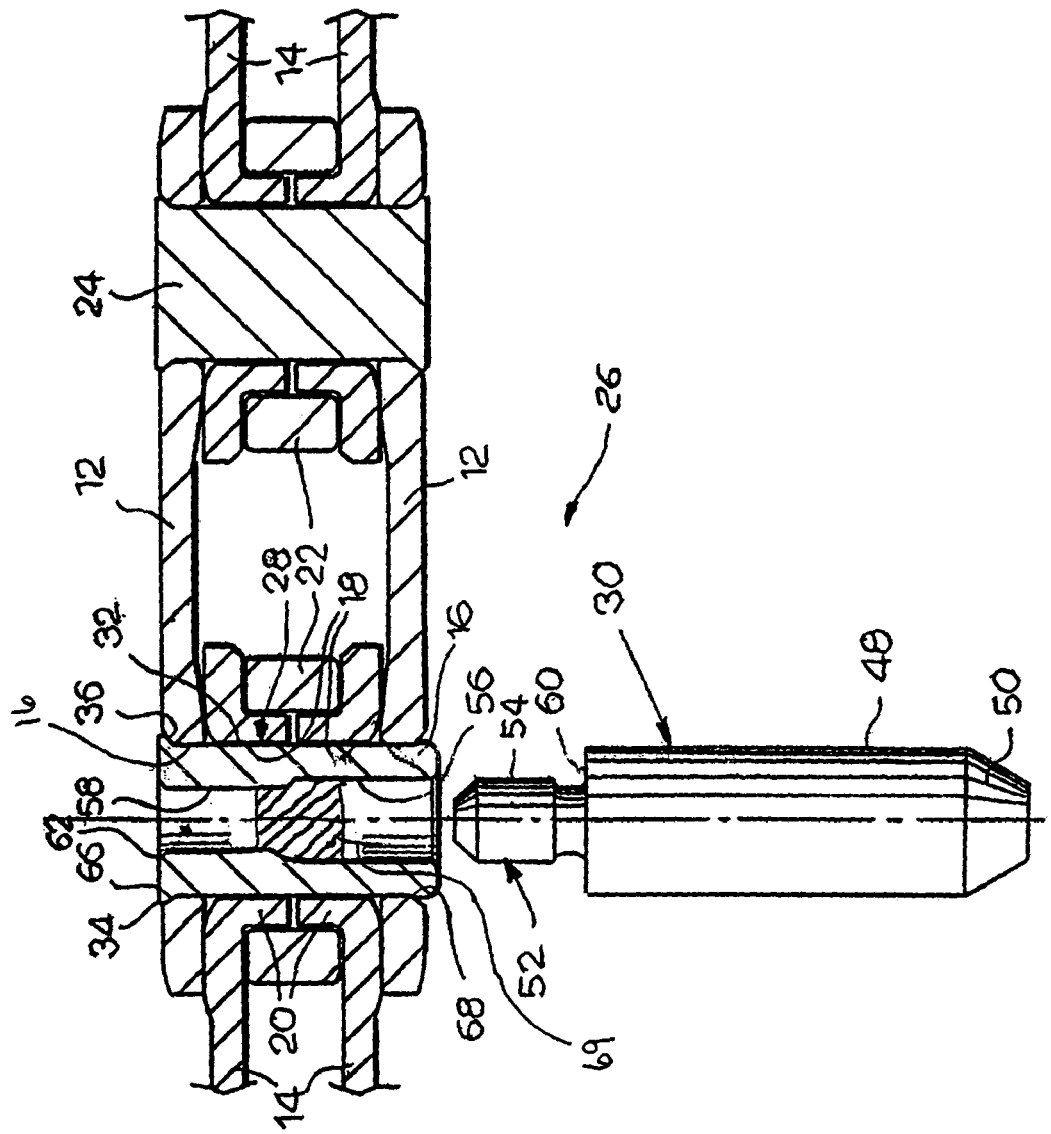
FIG. 6 shows an alternate embodiment of the pin shown in FIG. 3.

With reference to the drawings, numeral 10 designates the connecting or closing portion of a bicycle chain. The closing step provides the connection of the leading and trailing ends of the chain. The ends to be connected to each other comprise, on one side, a pair of outer plates 12 and, on the other side, a pair of inner plates 14. The outer plates 12 have a pair of aligned holes 16 and the inner plates 14 have a pair of holes 18 defined by collars 20, on which a roller 22 is rotatably mounted. The articulation of all the outer plates 12 and the inner plates 14 of the chain, except for the articulation pin which provides the connection of the leading and trailing ends of the chain, is provided by means of pins 24 having riveted ends, only one of which is shown in the drawings. The connection of the leading and trailing ends of the chain is obtained by means of an articulation device 26 comprising a pin 28 and a guide element 30. The pin 28 has a cylindrical surface 32 with a diameter such that it can be coupled with a slight interference fit within holes 16 of the outer plates 12. The cylindrical surface 32 of the pin 28 provides instead a coupling with clearance within holes 18 of the inner plates 14.

In a variant not shown, the surface 32 could have different diameters along its axis and particularly slightly greater diameters at the portions which are to be coupled with interference fit within holes 16 and a slightly smaller diameter at the central portion.

At a first end of pin 28 there is formed a shoulder 34 having a frusto-conical surface 36. In a variant not shown, the frusto-conical surface 36 could be replaced by a radial surface. At a second end, which is opposite to the first end, pin 28 has a snap engaging portion 38. As shown in greater detail in FIG. 5, the snap engaging portion 38 has a frustoconical portion 40 projecting from the cylindrical surface 32, a cylindrical portion 42 and an arcuate surface 44 connecting the cylindrical surface 42 to a front surface 46 of pin 28.

The guide element 30 has a cylindrical surface 48 having a diameter equal to or lower than the diameter of the cylindrical surface 32 of pin 28, so that it is inserted substantially with no interference within the aligned holes 16, 18 of plates 12, 14. The guide element 30 has an insertion end 50 with a frusto-conical shape and a second end having an integral pinshaped projecting portion 52 having a cylindrical surface 54 which provides a shape coupling with no interference with a hole 56 of pin 28. The guide element 30 has a front surface 60 which rests against the front surface 46 of pin 28.

The pin 28 has a second hole 58 which opens on a second front surface 62 of pin 28, opposite to the surface 46 which rests against the guide element 30. In the preferred embodiment shown in the drawings, the first hole 56 and the second hole 58 communicate with each other so as to define a through aperture extending along the pin 28. In the embodiment shown in FIG. 6, the pin may have a solid portion 69 between the first hole 56 and the second hole 58.

The sequence of operation for inserting the pin 28 into the aligned holes 16, 18 of plates 12, 14 is shown in FIGS. 1 through 3. In the first operative stage shown in FIG. 1, the guide element 30 is inserted into holes 16, 18. This insertion is carried out without the use of any tools, since the coupling within the outer surface 48 of the guide element 30 and the holes 16, 18 is accomplished with no interference. Then, on pin 28 there is applied an insertion force in the direction shown by arrow F in FIG. 1 by using an inserting tool of a conventional type having a tip 64 which engages the second hole 58, as diagrammatically shown in FIG. 1. The guide element 30 substantially has the function of keeping holes 16, 18 aligned to each other during the insertion of the pin 28.

During the insertion of the pin 28, the snap engaging portion 38 expands the holes 16 of the outer plates 12 radially and elastically. At the end of the inserting operation, the pin 28 is in the configuration shown in FIGS. 2 and 3, in which the shoulder 34 rests against of the first outer plates 12 and the portion 38 snap engages the outer plates 12. It can be noted that the outer plates 12 have frusto-conical counter sunk portions 66, 68 at the holes 16, having substantially the same inclination as the conical surfaces 36 and 40 of pin 28, so that at the end of the inserting operation the frusto-conical surfaces 36, 40 of pin 28 provide a shape coupling respectively with the frusto-conical surfaces 66, 68 of the outer plates 12.

In the case in which the shoulder 34 has a surface 36 which is radial rather than frusto-conical, the counter sunk portion 66 would be replaced by a seat with a support surface which is radial with respect to hole 16. As shown in FIG. 3, after the insertion of the pin 28, the portion 52 of the guide element 30 is extracted from the hole 56 of pin 30. This extraction does not require the use of any tools since there is no coupling with interference fit between the surfaces 54 and 56. With reference to FIG. 3, when the insertion of pin 28 is completed, the front surface 62 is substantially flush with the outer surface of the respective plate 12, similarly to the front surface of riveted pins 24. The front surface 46 of the snap engaging portion 38 projects a little more than the front surface of the riveted pins 24, but the length of projection is very reduced and, being present only of one of the pins of the chain, it does not give rise to problems of interference with the sprockets, not even when the distance between these sprockets is very reduced such as in the case of units comprising ten sprockets, also because the snap engaging portion 38 is preferably oriented towards the sprockets with lower number of teeth.

In FIG. 4 there is shown a variant of the articulation device according to the invention. The only difference with respect to the embodiment described in the foregoing lies in that the guide element 30 is provided with an annular slot 70 where an o-ring 72 of elastic material is housed which, in an undeformed condition, projects outwardly from the cylindrical surface of the guide element to provide a slight interference fit with the inner surfaces of the holes 18 in order to provisionally hold the guide element before carrying out the inserting operation.

From the foregoing description it is clearly apparent that the system according to the present invention enables a pin 28 to be inserted with snap engagement of one end within one of the outer plates, obtaining thereby a very secure engagement against an extraction in the direction of the pin axis. The arcuate surface 44 of the snap engaging portion 38 of the pin provides for the holes 16 to be enlarged in a radial direction during the insertion of the pin. In this manner a snap anchoring is obtained which is particularly efficient and reduces the risk of damaging the outer surface of the pin during the insertion.

Naturally, while the principle of the invention remains the same, the details of construction and the embodiments may widely vary with respect to what has been described and illustrated, without departing from the scope of the present invention as defined in the following claims.

The invention claimed is:

1. A device for forming a link of a bicycle chain, the device comprising:
   a guide element which has a first end for insertion through aligned apertures in a pair of opposed plates, a body portion that is substantively equal in diameter to the apertures in the opposed plates and a second end having a projection which has a diameter that is less than the diameter of the apertures, wherein the second end projection includes a circumferential groove section at a first end proximate to the body portion and a chamfered portion at a second outer end thereof; and
   an articulation pin with a first end that defines a recess that mates with and entirely encloses the guide element projection in a sliding engagement that is capable of being reversed so that the pin is separated from the projection, after the articulation pin inserted within the aligned apertures of said opposed plates and the articulation pin remaining in the apertures, and a second end which is of sufficient diameter to radially expand an aperture in one of the opposed plates during the insertion of the articulation pin.

2. Device according to claim 1, wherein the guide element is a separate piece from the pin.

3. Device according to claim 1, wherein the pin has a hole adapted to receive a tip of an inserting tool.

4. Device according to claim 3, wherein the pin has a through aperture between said first and second hole.

5. Device according to claim 3, wherein the pin has a solid portion between said first and second hole.

6. Device according to claim 1, wherein the pin comprises at least one frustro-conical surface which is for engaging a co-operating frustro-conical surface of said plates.

7. Device according to claim 1, wherein the pin comprises at least one radial surface which is for engaging a co-operating radial support surface of said plates.

8. Device according to claim 1, wherein the sliding engagement involves no adhesive.

9. A method for inserting an articulation pin, provided at one of its ends with a hole, within aligned holes of a pair of outer plates and a pair of inner plates of a bicycle chain comprising the following steps:
   a. inserting a guide element, provided at one of its ends with a pin-shaped projecting portion, within said aligned holes, and wherein a diameter of the guide element along the entire longitudinal axis of the guide element is less than a diameter of the holes;
   b. slidably coupling the hole of the pin with the pin shaped projecting portion of the guide element, and wherein the pin shaped portion of the guide element includes a circumferential groove section at a first end proximate to the body and a chamfered outer end portion;
   c. applying an insertion force to said pin for inserting the pin within said aligned holes; and
   d. separating said guide element from said pin after insertion of the pin in said holes.

10. A method according to claim 9, wherein said coupling between the pin-shaped projecting portion of said guide element and the hole of said pin is made without interference.

11. A method according to claim 9, comprising the step of elastically expanding the holes of the outer plates in a radial direction during the insertion of said pin by means of a snap engaging portion provided on an end portion of the pin.

12. A method according to claim 9, wherein during the step of slidably coupling the hole of the pin with the pin shaped projecting portion of the guide element involves no adhesive.

13. A device for forming a link of a bicycle chain, the device comprising:
   a guide element having a first end for insertion through aligned apertures in a pair of opposed plates having an interior diameter, a body portion that is substantially equal to or less in diameter than the apertures in the opposed plates, and a second end having a projection that has an outside diameter less than the interior diameter of the apertures; and
   an articulation pin that defines a first end portion, a second end portion and a through recess having a first narrow portion proximate the first end portion and a second wider portion proximate the second end portion, wherein the wider portion mates with and entirely encloses the guide element end projection in a reversible sliding engagement, and a second end of sufficient diameter to radially expand an aperture in one of the opposed plates during the insertion of the articulation pin.

* * * * *